Oct. 9, 1934.  A. C. GRUNWALD  1,976,610
HOLDER FOR FROZEN CONFECTIONS
Filed Dec. 9, 1933  2 Sheets-Sheet 2
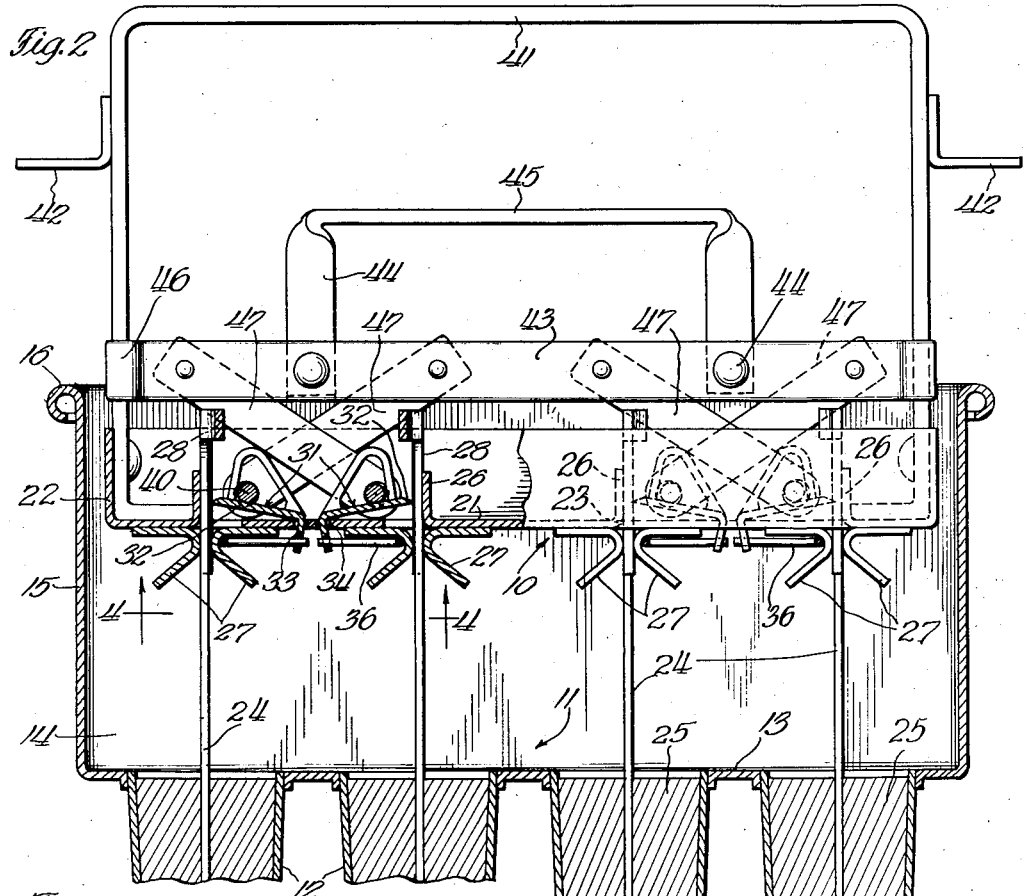
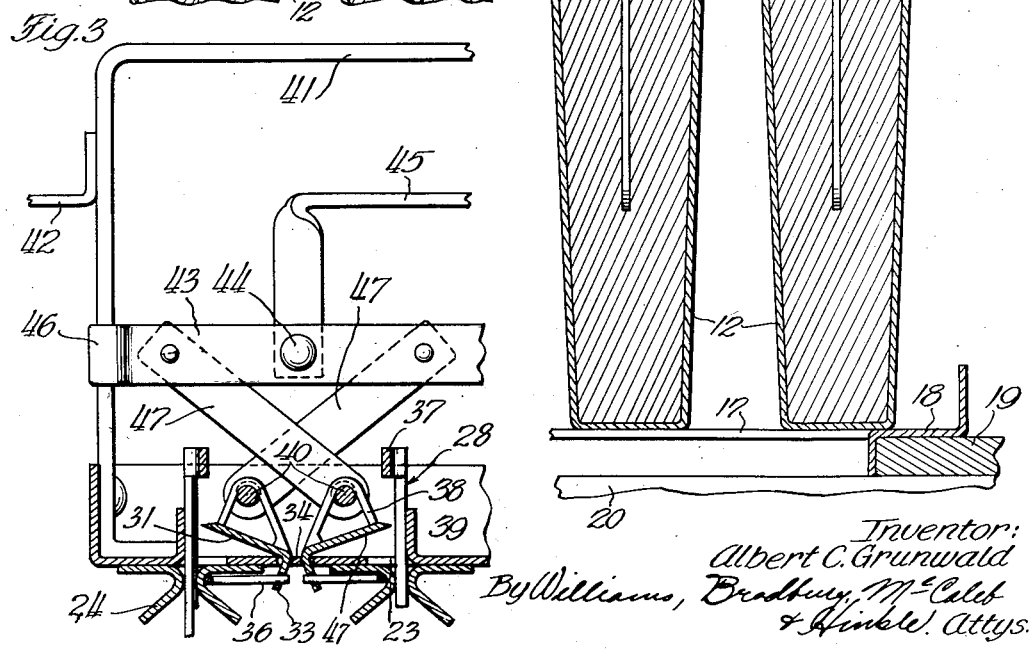
Inventor:
Albert C. Grunwald
By Williams, Bradbury, McCaleb & Hinkle, Attys.

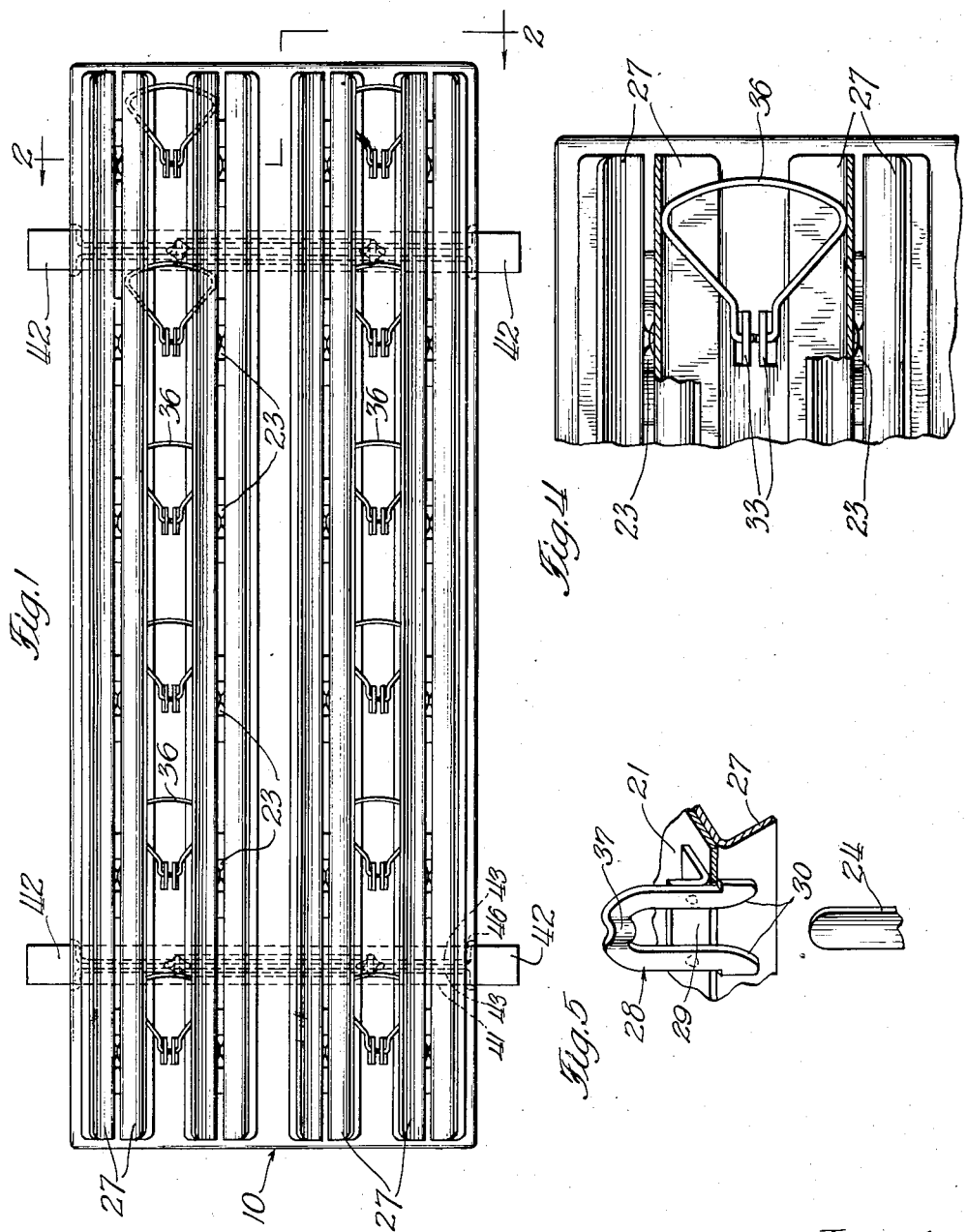

Patented Oct. 9, 1934

1,976,610

UNITED STATES PATENT OFFICE 1,976,610

HOLDER FOR FROZEN CONFECTIONS

Albert C. Grunwald, River Forest, Ill., assignor to Precision Metal Workers, Chicago, Ill., a corporation of Illinois Application December 9, 1933, Serial No. 701,680

7 Claims. (Cl. 107—8)

This invention relates to holders for frozen confections and particularly frozen confections which are provided with sticks to serve as handles.

The invention is particularly intended to cooperate with molds having a plurality of pockets in which the frozen confections are formed. Such molds are normally provided with a large number of pockets arranged in longitudinal and transverse rows. Each frozen confection is provided with a stick to serve as a handle, which stick projects upwardly out of the mold pocket.

The present holder is adapted to be supplied to such a mold so as to receive the upper ends of said sticks. The holder is provided with automatic means for gripping the sticks and means adapted to be actuated to release the sticks. Consequently, the holder may be employed to engage the sticks, withdraw the confections from the mold pockets and hold the confections while being treated in subsequent operations, for example chocolate coating and final chilling. When manufacture is complete, the gripping means may be actuated so as to release the handles and the confections with which they are associated.

One of the objects of the invention is to provide an improved holder of this type.

A further object of the invention is to provide gripping means which are independently controlled so that sticks of varying thickness may be employed and may be released simultaneously.

A further object of the invention is to provide an improved spring control for each individual gripping means.

A further object of the invention is to provide an improved mounting for the gripping means.

Other objects, advantages, and capabilities of the invention will readily be understood from the following description of a preferred embodiment thereof, taken in conjunction with the accompanying drawings, in which Figure 1 is an inverted plan view of the complete holder, on a reduced scale;

Fig. 2 is an end elevation thereof, partly in section, the section being taken on the line 2—2 of Fig. 1, shown in cooperative engagement with a mold containing confections, which is shown in section;

Fig. 3 is a sectional detail similar to the left-hand part of Fig. 2, showing the operative parts in position for the removal of the handles and confections;

Fig. 4 is a detail plan view, partly in section, taken on the line 4—4 of Fig. 2;

Fig. 5 is a perspective detail showing the manner in which the guide and stop elements, which receive the upper ends of the sticks, are arranged.

Referring to the drawings, the reference numeral 10 designates the holder and the reference numeral 11 designates the mold having a large number of pockets 12 in which the confections are formed. These pockets are arranged so as to depend from the bottom 13 of a dish-like portion 14 of the mold which comprises sides 15 provided with beaded upper edges 16. The pockets 12 rest upon transfer bars 17 to which they may be spot-welded or otherwise suitably connected. The bars 17 are rigidly secured to rail elements 18 which are adapted to engage rails 19 on a table 20 so that the mold may be slid along in the desired direction.

The holder 10 comprises a base portion 21 which may be in the form of a plate which is somewhat smaller than the dish portion 14 of the mold so that the holder may readily be inserted thereinto. The plate 21 is provided with marginal upturned walls 22, which together with the plate 21 constitute a dish-like integral element.

The plate 21 is provided with openings 23 corresponding in shape, number and location to the sticks 24 of the confections 25 formed in the pockets 12 of the mold. In the embodiment illustrated there are four longitudinal rows of openings arranged in six transverse rows, there being twenty-four pockets in the mold 15 arranged in this order. The openings 23 are formed by stamping tongues 26 out of the plate 21 at the appropriate locations. These tongues are turned upwardly, as shown in Figs. 2, 3 and 5.

On its underside the plate 21 has secured thereto, suitably by spot-welding, pairs of angle strips 27, the strips of each pair being located adjacent each other and spaced apart a distance equal to the maximum thickness of the handles or sticks 24. The angle strips 27 are bent to an acute angle and one of each pair is located with its angular edge in alignment with the inner faces of one longitudinal row of tongues 26. The other strips of each pair overlie portions of the openings 23, reducing the width of these openings to approximately that of the thickest sticks 24. The downwardly extending flanges of each pair of angle strips 27 diverge outwardly from the openings 23 associated with them. These outwardly diverging flanges serve as guides which direct the upper ends of the handles 24 into the appropriate openings 23.

In the embodiment of the invention illustrated, the openings 23 are longer than the width of the sticks or handles 24, and each opening has inserted therein a guide and stop element 28 of generally horseshoe form, the two ends being directed downwardly. Between the two legs of the element 28 there is an opening 29 of the same width as the stick 24 and the upper end of this opening is curved so as to correspond with the curved end of the stick. The lower ends of the leg of the stop element 28 are cut away on their inner sides to provide curved surfaces 30 which serve to guide the sticks 24 into proper relation with the stop element 28, or, rather, they serve to aid in positioning the holder with relation to the sticks so as to bring the latter into alignment with the openings 29.

Opposite each tongue 26 I provide a pivoted dog 31 which is adapted to grip a stick located between the dog and the corresponding tongue 26. As shown in Figs. 2 and 3, the dogs 31 comprise a relatively flat pointed portion 32 and a relatively short portion 33 turned downwardly therefrom at one end. The pointed end is adapted to approach the corresponding tongue 26 and the downwardly turned portion 33 is adapted to project through an opening 34 at the appropriate position in the plate 21.

As best seen in Fig. 1, as a result of the location of the tongues 26, the dogs 31 are located in two pairs of adjacent rows. The openings 34 are located on the plate 21 in two pairs of rows, the rows of each pair being quite close together. As a result of this the downwardly projecting portions 33 of the dogs 31 are likewise located in two pairs of rows, the rows of each pair being quite close together. The portions 33 of the dogs 31 which project through to the underside of the plate 21 are provided with openings 35. Each adjacent pair of downwardly projecting portions 33 is associated with a spring 36 of a shape and configuration best shown in Figs. 1 and 4. These springs are suitably pear-shaped, the major width thereof being such that they fit fairly snugly between the adjacent angular strips 27, extending into the apical portions of such strips so that they are effectively housed and prevented from coming into contact with projections which might dislodge them, by the downwardly directed flanges of said strips.

The springs 36 are preferably formed from pieces of wire, the central portion of which is formed into a large round bend. The ends of the wire approach each other and approach a pair of downwardly directed lugs 33 of a pair of dogs 31. The extremities of the wire are turned inwardly towards each other, as best seen in Fig. 4, and project through the openings 35 in the lugs 33. It will readily be seen with reference to Fig. 2, that the tendency of the springs being to force the lugs 33 towards each other, the dogs are biased in such a direction that their flat portions 32 tend to rest upon the plate 21. The outer ends of the flat portions 32 of the dogs 31 are sharpened so that they bite into sticks or handles 24 which may be located between them and the tongues 26. It will readily be understood that when the sticks or handles 24 are thus gripped they will be firmly held so that the holder may support a large number of frozen confections. To release the frozen confections from the holder it is merely necessary to elevate the dogs 31. Means for effecting this result will hereinafter be more fully described.

As will more fully appear from the subsequent description of the operation of the holder, the holder is directed downwardly upon a set of handles or sticks 24 projecting upwardly from the pockets 12 of the mold 11. The application of the holder to the sticks is facilitated by the converging webs 27 and sloping or curved extremities of the guide and stop element 28. This guide and stop element 28 is preferably fabricated from metal substantially thicker than the thickest stick or handle which may be used. In order to enhance the stopping effect of the members 28 it is preferred to displace a portion of the stock of which the element is made, away from the associated tongue 26. The stock displaced is preferably at the apex of the guide and stop element 28, as best seen in Figs. 1 and 5, and forms an abutment 37. It will readily be understood that the tongue 26 prevents lateral escape of the stick 24 from the guide and stop element 28 on one side thereof and the abutment 37 effectively prevents escape of the stick in the opposite direction. The abutment 37 is substantially narrower than the stick so that the stop member 28 serves as an abutment for the upper end of the stick or handle 24, for a distance much greater than the thickness of the stock of which it is made.

Each dog 31 is provided at each side with an upwardly turned flange 38 of substantially triangular form. Each flange 38 is provided with a relatively large opening 39 suitably of similar form. The flanges 38, like the dogs which carry them, are arranged in four longitudinal rows and longitudinal bars 40 extend through the aligned openings 39, there being four such bars. As best seen in Figs. 2 and 3, the bars 40 are relatively small in comparison with the openings 39 so that they have a considerable degree of free movement therein. It will readily be understood that by simply elevating the bars 40, all the dogs 31 may be raised and the sticks 24 and frozen confections with which they are associated, may thereby be released.

The holder can conveniently be carried by means of two bail-like handles 41 which are rigidly secured to the plate 21 and its associated rim. These bails are preferably located near the ends of the holder, as best seen in Fig. 1. A pair of lugs 42 are mounted on the sides of the bails 41 so as to project outwardly. These lugs 42 may suitably serve as supports for the holder, whereby the holder may be moved on rails or the like for the convenient performance of such operations as are performed upon the frozen confections, for example, coating with chocolate, hardening the chocolate coating, etc. The bails 41 serve as a mounting for the means for elevating the bars 40, which means will now be described.

A pair of transverse bars 43 are secured together by means of rivets 44. The bars 43 are maintained in spaced relation by the ends of a bail-like handle 45 extending therebetween. The handle 45 is secured to a pair of transverse elements 43 by means of certain of the rivets 44. The ends of the elements 43 are bent away from each other and then bent outwardly to provide extremities 46 which are adapted to embrace in sliding relation the vertical portions of a bail 41. It will be understood that a structure of the type just described is mounted on each bail 41. Each rod 40 passes through openings in a pair of links 47, the upper ends of which links are located between one or other of the pairs of transverse elements 43, being pivotally secured thereto by means of certain of the rivets 44. As best seen in Fig. 2, the links 47 associated with an adjacent pair of rods 40 cross each other, which arrangement facilitates the production of a comparatively small and effective structure for the purpose for which it is intended.

The operation of the device will in the main be understood from the foregoing description. As indicated above, the holder is applied to a mold so that the upper end of the sticks or handles 24 become engaged between the dogs 31 and tongues 26. This engagement may suitably be effected while the confections are still frozen hard to the mold pockets 12. The mold pockets 12 may then be immersed in water or heated in a suitable way so as to render the frozen confections capable of being withdrawn. When that point is reached the holder is elevated by the handles or bails 41 carrying all the frozen confections with it. As indicated above, the frozen confections may be moved from place to place, with the aid of the lugs 42 during the course of completing manufacture of the confections.

Owing to the action of the springs 36, the dogs 31 are held in handle-gripping position. Owing to the relatively large size of the openings 39 a considerable variation in stick thickness is permitted since no exceptional deflection of the dog 31 from its normal position will be communicated through the associated rod 40 to any other dog. After the manufacturing operation is completed it becomes necessary to remove the confections from the holder and this can readily be done by elevating the rods 40 by means of the handles 45. The motion of the handles 45 is communicated through the links 47 to the rods 40. The elevation of the rods 40 is such that the largest sticks which may enter the openings 23 are released in this way. The springs 36 have an advantageous effect in that they oppose the entrance of the sticks 24 into the openings 23. This facilitates the application of the holder to a mold full of confections since it has a tendency to delay the entrance of any handle 24 or group of handles into the openings 23 until the holder is placed in proper registering position with all the handles.

Although the invention has been described in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A holder for frozen confections provided with handles, comprising a plate having a plurality of openings adapted to receive said handles, inclined guide means on the underside of said plate adapted to assist registration of said handles with said openings, a dog associated with each opening adapted to engage a handle extending therethrough, said dogs having lugs extending downwardly through slots in said plate, and springs nested above said inclined guide means tending to move said dogs to gripping position.

2. A holder for frozen confections provided with handles, comprising a plate having a plurality of openings adapted to receive said handles, said openings being arranged in rows, angle strips having an acute angle extending along said openings, dogs associated with said openings and having lugs extending through said plate, said lugs being provided with openings, the lugs of a pair of rows being located close together, and springs on the underside of said plate nested within an adjacent pair of angle strips, the ends of each spring being received within the openings of an adjacent pair of lugs, thereby individually biasing the dogs towards gripping position.

3. In a confection holder of the type described, in combination, a plate having an opening for receiving a confection handle, a dog adapted to dog said handle above the plate, said dog having a downwardly directed lug provided with an opening and said plate being provided with an opening permitting said lug to extend downwardly through the plate, and a spring mounted on the underside of said plate having a portion extending into the opening in said lug, thereby mounting the dog on the plate and biasing it towards handle engaging position.

4. In a confection holder of the type described, in combination, a plate, a plurality of tongues struck up from said plate leaving aligned openings, angle strips having an acute angle secured to the underside of said plate reducing said openings nearly to the thickness of a confection handle, a horseshoe guide and stop element in each opening having its lower ends shaped to guide said handle thereinto, the apex of the guide and stop element being displaced away from the tongue to provide an abutment wider than the stock of said element, and a dog mounted on the plate adapted to secure a handle between it and said tongue.

5. In a confection holder of the type described, in combination, a plate, a plurality of tongues struck up from said plate leaving aligned openings, angle strips having an acute angle secured to the underside of said plate reducing said openings nearly to the thickness of a confection handle and a horseshoe guide and stop element in each opening having its lower ends shaped to guide said handle thereinto, the apex of the guide and stop element being displaced away from the tongue to provide an abutment wider than the stock of said element.

6. A holder for confections provided with handles, comprising a plate provided with a plurality of openings arranged in rows, a dog pivotally mounted on said plate associated with each opening, said dogs being provided with upturned flanges having openings arranged in rows, a rod extending freely through each aligned row of openings, bars slidably mounted above said plate, and links freely connected to said rods and pivoted to said bars, the links of adjacent rods crossing each other and being pivoted to the bar at a point substantially behind the pivots of the associated dogs.

7. A holder for confections provided with handles, comprising a plate provided with a plurality of openings arranged in rows, a dog pivotally mounted on said plate associated with each opening, said dogs being provided with upturned flanges having openings arranged in rows, a rod extending freely through each aligned row of openings, bail handles on said holder, bars slidably mounted on said bail handles above said plate, links freely connected to said rods and pivoted to said bars, the links of adjacent rods crossing each other and being pivoted to the bar at a point substantially behind the pivots of the associated dogs, and springs biasing each dog individually towards handle engaging position, the connections between the bars and the individual dogs providing sufficient lost motion to enable handles of varying thickness to be gripped effectively at the same time.

ALBERT C. GRUNWALD.